United States Patent [19]

Geuze

[11] Patent Number: 4,882,417

[45] Date of Patent: Nov. 21, 1989

[54] PREPARATION OF OLEFIN/CO COPOLYMER WITH CONTROLLED ADDITION OF CATALYST COMPOSITION

[75] Inventor: Maarten M. Geuze, Amsterdam, Netherlands

[73] Assignee: Shell Oil Company, Houston, Tex.

[21] Appl. No.: 308,286

[22] Filed: Feb. 9, 1989

[30] Foreign Application Priority Data

Feb. 10, 1988 [NL] Netherlands ......................... 8800324

[51] Int. Cl.$^4$ ............................................. C08G 67/02
[52] U.S. Cl. .................................................... 528/392
[58] Field of Search .......................................... 528/392

[56] References Cited

U.S. PATENT DOCUMENTS 3,694,412  9/1972  Nozaki .................................. 260/63

FOREIGN PATENT DOCUMENTS 121965  9/1984  European Pat. Off. .
181014  4/1986  European Pat. Off. .
222454  5/1987  European Pat. Off. .
257663  2/1988  European Pat. Off. .

Primary Examiner—Harold D. Anderson
Attorney, Agent, or Firm—Dean F. Vance

[57] ABSTRACT

An improved process for the production of polyketone polymers in the presence of a catalyst composition formed from a palladium compound, the anion of certain strong acids and certain bidentate ligands comprises the provision of a controlled proportion of the catalyst composition at the outset of polymerization and providing the remainder of the catalyst composition only when the polymer concentration in the product-containing suspension has reached a minimum value.

4 Claims, No Drawings

PREPARATION OF OLEFIN/CO COPOLYMER WITH CONTROLLED ADDITION OF CATALYST COMPOSITION

FIELD OF THE INVENTION

The present invention relates to an improved process for the production of polymers of carbon monoxide and at least one ethylenically unsaturated hydrocarbon. More particularly, the invention relates to the production of linear alternating polymers of carbon monoxide and at least one ethylenically unsaturated hydrocarbon which have relatively high bulk density.

BACKGROUND OF THE INVENTION

The class of polymers of carbon monoxide and olefin(s) has been known for some time. Brubaker, U.S. Pat. No. 2,495,286, produced such polymers of low carbon monoxide content in the presence of free radical initiators, e.g., peroxy compounds. U.K. No. 1,081,304 produced similar polymers of higher carbon monoxide content in the presence of alkylphosphine complexes of palladium as catalyst. Nozaki extended the process to produce linear alternating polymers in the presence of arylphosphine complexes of palladium and certain inert solvents. See, for example, U.S. Pat. No. 3,694,412.

More recently, the class of linear alternating polymers of carbon monoxide and at least one ethylenically unsaturated hydrocarbon has become of greater interest in part because of the greater availability of the polymers. The more recent processes for the production of such polymers is illustrated by a number of Published European Patent Application Nos. including 121,965, 181,014, 222,454 and 257,663 among others. These processes generally employ a catalyst composition formed from a Group VIII metal salt wherein the metal is palladium, cobalt or nickel, the anion of certain strong acids and a bidentate ligand of phosphorus, arsenic or antimony. In a typical polymerization, the polymer product is obtained as a suspension in a polymerization diluent. In principle, the polymerization is suitably carried out as a batchwise process or in a continuous manner.

Batch polymerization is carried out by introducing the catalyst into a batch reactor containing the monomers and the reaction diluent and which is at the desired polymerization temperature and pressure. As the polymerization proceeds, the pressure drops, the concentration of the monomers in the polymerization mixture drops and the viscosity of the suspension increases. Polymerization is continued until the viscosity of the suspension has increased to the point that continued heat removal becomes difficult. In such a batchwise process, the only variable that remains constant is the temperature. A variation of the batchwise process is the semi-batch production in which the pressure as well as the temperature is kept constant by the addition of monomers to the reactor during the polymerization process.

One of the more important properties of the linear alternating polymers of the invention is their bulk density. This ratio of weight (amount) of polymer per unit volume is important in the production, purification, storage and transportation of the polymers. An increase in bulk density, for example, reflects an increase in the amount of polymer that can be produced in a reactor of specified volume. A polymer of high bulk density retains less liquid per unit weight of polymer during post-polymerization treatment of the polymer in procedures such as washing and filtering. It is known that the bulk density of the polymer product is related to the concentration of the polymer in the polymer-containing suspension of the polymerization process. The maximum polymer concentration expressed in kg of polymer/100 kg of polymer-containing suspension, is approximately 100 times the bulk density of the resulting polymer product. Thus, for example, increase in the bulk density of the polymer product by a factor of 5 will approximately increase by the same factor of 5 the amount of polymer produced in a reactor of any given volume. It would be of advantage to provide a process for the production of linear alternating polymers of carbon monoxide and at least one ethylenically unsaturated hydrocarbon wherein the polymer product is of relatively high bulk density. A copending U.S. patent application, Ser. No. 235,265, filed Aug. 23, 1988 describes a continuous process for increasing the bulk density of the product. It would be of advantage to provide a batchwise process for increasing the polymer bulk density.

SUMMARY OF THE INVENTION

The present invention provides a process for the production of linear alternating polymers of carbon monoxide and at least one ethylenically unsaturated hydrocarbon, which polymers are characterized by a relatively high bulk density. The invention further relates to the production of such polymers by a batch-type process wherein the extent and time of catalyst composition addition is controlled.

DESCRIPTION OF THE INVENTION

It has now been found that, in the batchwise production of polymer of carbon monoxide and at least one ethylenically unsaturated hydrocarbon, the amount of catalyst composition present and the time at which the catalyst composition is provided is important in the production of polymer of relatively high bulk density. More particularly, in order to obtain polymer product of 0.2 g/ml or greater, from about 25% to about 85% of the catalyst composition should be present at the outset of the polymerization with the remainder of the catalyst added only when the concentration of the polymer product in the polymer-containing suspension has reached at least 0.2 g of polymer per 100 g of suspension.

The process of the invention therefore comprises an improved method for the batchwise production of linear alternating polymers of carbon monoxide and at least one ethylenically unsaturated hydrocarbon. The ethylenically unsaturated hydrocarbons which are useful as precursors of the polymers of the invention have up to 20 carbon atoms inclusive, preferably up to 10 carbon atoms inclusive, and are aliphatic including ethylene and other alpha-olefins such as propylene, 1-butene, isobutylene, 1-octene and 1-dodecene, or are arylaliphatic containing an aryl substituent on an otherwise aliphatic molecule, particularly an aryl substituent on a carbon atom of the ethylenic unsaturation. Illustrative of this latter class of ethylenically unsaturated hydrocarbons are styrene, p-methylstyrene, p-ethylstyrene and m-isopropylstyrene. Preferred polymers are copolymers of carbon monoxide and ethylene or terpolymers of carbon monoxide, ethylene and a second hydrocarbon of at least 3 carbon atoms, particularly an alpha-olefin such as propylene. Such polymers are now often referred to as polyketone polymers or polyketones.

When the preferred terpolymers of carbon monoxide, ethylene and a second hydrocarbon are produced, there will be at least two units incorporating a moiety of ethylene for each unit incorporating a moiety of the second hydrocarbon. Preferably there will be from about 10 units to about 100 units incoporating a moiety of ethylene for each moiety incorporating a moiety of the second hydrocarbon. The polymer chain of the preferred polymers is therefore represented by the formula

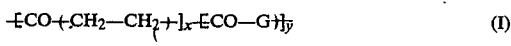   (I)

wherein G is the moiety of the second ethylenically unsaturated hydrocarbon polymerized through the ethylenic unsaturation thereof. The —CO—(CH$_2$—CH$_2$)— units and the —CO—(G)— units are formed randomly throughout the polymer chain and the ratio of y:x is no more than 0.5. In the modification of the invention wherein copolymer of carbon monoxide and ethylene is produced, there will be no second hydrocarbon present and y is 0. When y is other than 0, i.e., terpolymers are produced, the ratio of y:x is preferably from about 0.01 to about 0.1. The end groups or "caps" of the polymer chain will depend upon what materials are present during the polymerization and whether and how the polymer is purified. The precise nature of the polymers will not, however, depend to any considerable extent upon the particular end groups so that the polymer is fairly described by the polymer chain as depicted above.

Of particular interest are the polymers of the above formula having a molecular weight of from about 1000 to about 200,000, particularly those of molecular weight from about 10,000 to about 50,000. The physical properties of these polymers will depend in part upon the molecular weight of the polymer, whether the polymer is a copolymer or a terpolymer and, in the case of terpolymers, the proportion of the second hydrocarbon present. Typical melting points of such polymers are from about 175° C. to about 280° C., preferably from about 210° C. to about 270° C.

The polymers of the invention are provided by the general methods of Published European Patent Applications Nos. 121,965, 181,014, 222,454 and 257,663 and later related published applications wherein the linear alternating polymer of carbon monoxide and at least ethylenically unsaturated hydrocarbon is produced in the presence of a catalyst composition formed from a Group VIII metal compound wherein the metal is selected from palladium, cobalt or nickel, the anion of a non-hydrohalogenic acid having a pKa less than about 6 and a bidentate ligand of phosphorus, arsenic, sulfur or antimony. Although the scope of the suitable catalyst compositions is extensive, preferred catalysts compositions are produced from a palladium compound, the anion of a non-hydrohalogenic acid having a pKa less than about 2 and a bidentate ligand or phosphorus.

The palladium compound employed in the preferred catalyst compositions is a palladium salt of a carboxylic acid, particularly a palladium alkanoate wherein the alkanoate moiety has up to 10 carbon atoms, inclusive. Palladium acetate is an especially preferred palladium salt.

The anion of the non-hydrohalogenic acid is the anion of an inorganic acid such as sulfuric acid or perchloric acid or an organic acid such as trifluoroacetic acid, dichloroacetic acid, methanesulfonic acid or p-toluenesulfonic acid. The anions of trifluoroacetic acid or p-toluenesulfonic acid are preferred. The anion is provided in the form of the acid or alternatively in the form of a metal salt of the acid, preferably larly non-noble transition metal salts of the acid and particularly a copper salt. In yet another modification, the palladium catalyst component and the anion are provided as a single compound, for example, Pd(CH$_3$CN)$_2$(O$_3$S—C$_6$H$_4$—CH$_3$)$_2$, which is the complex formed when palladium chloride reacts with silver p-toluenesulfonate in acetonitrile. Regardless of the particular mode of provision, the anion is preferably present in an amount from about 0.5 equivalent to about 200 equivalents of anion per gram atom of palladium (as the metal). Preferably the anion is present in a quantity of from about 1 equivalent to about 100 equivalents per gram atom of palladium.

The bidentate ligand of phosphorus is preferably a compound represented by the formula

   (II)

wherein R independently is an organic group, preferably an aromatic group of up to 10 carbon atoms inclusive which is hydrocarbyl or is substituted with non-hydrocarbyl polar groups, substituted with non-hydrocarbyl polar groups, particularly alkoxy groups of up to 4 carbon atoms located in aromatic ring positions ortho or para to the carbon atoms connecting the group to the phosphorus. R' is a divalent bridging group of up to 10 carbon atoms inclusive having from two to four carbon atoms, but preferably three carbon atoms in the phosphorus-phosphorus bridge. In preferred modifications, each R is phenyl or substituted phenyl, particularly alkoxyphenyl and all R groups are the same. Illustrative of such bidentate phosphorus ligands are 1,3-bis(diphenylphosphino)propane, 1,2-bis(diphenylphosphino)ethane, 1,3-bis(diphenylphosphino)-2,2-dimethylpropane, 1,3-bis[di(2-methoxyphenyl)phosphino]propane, 1,4-bis[di(2-ethoxyphenyl)phosphino]butane and 1,3-bis[di(4-methoxyphenyl)phosphino]propane. The compounds 1,3-bis(diphenylphosphino)propane and 1,3-bis[di(2-methoxyphenyl)phosphino]propane constitute a preferred class of bidentate phosphorus ligands, particularly 1,3-bis(diphenylphosphino)propane. The bidentate ligand is employed in a quantity of from about 0.1 mole of about 2 moles per mole of palladium compound and preferably from about 0.75 mole to about 1.5 mole per mole of palladium compound.

It is on occasion useful, but not required, to utilize a quinone as a fourth catalyst composition component in order to enhance the activity of the catalyst composition. Quinones of up to 10 carbon atoms including benzoquinones, napthoquinones and anthraquinones are suitable, particularly 1,4-quinones. The compounds 1,4-benzoquinone and 1,4-naphthoquinone are preferred when a quinone is employed as a catalyst composition component. The presence of a quinoine is not required, of course, but when present the quinone is employed in an amount up to about 1000 moles per gram atom of palladium. Preferred amounts of quinone, when employed, are from about 25 moles to about 250 moles per mole of palladium.

The polymerization process of the invention is conducted in the liquid phase under polymerization conditions in a polymerization diluent in which the polymer product is insoluble. Suitable polymerization diluents include the lower alkanols of up to 4 carbon atoms inclusive, such as methanol, ethanol or isopropanol, or mixtures of the lower alkanol with a lower aliphatic ketone such as acetone or methyl ethyl ketone. The use of methanol as the polymerization diluent is preferred. The catalyst composition employed in the process of the invention is typically prepared by adding the catalyst composition components to at least a portion of the polymerization diluent and providing the resulting composition to the reaction mixture as indicated below. The quantity of catalyst composition to be utilized will suitably contain from about $1 \times 10^{-7}$ gram atom of palladium to about $1 \times 10^{-3}$ gram atom of palladium per mole of ethylenically unsaturated hydrocarbon monomer and preferably from about $1 \times 10^{-6}$ gram atom of palladium to about $1 \times 10^{-4}$ gram atom of palladium per mole of ethylenically unsaturated hydrocarbon monomer. The molar ratio of the ethylenically unsaturated hydrocarbon reactants to carbon monoxide is suitably from about 10:1 to about 1:5 but preferably is from about 5:1 to about 1:2. Suitable polymerization conditions include a polymerization temperature of from about 20° C. to about 200° C., but preferably from about 30° C. to about 150° C. Typical polymerization pressures are from about 1 bar to about 200 bar, more often from about 20 bar to about 100 bar.

In order to obtain the desired polymer product of relatively high bulk density, the polymerization is conducted by charging the monomeric reactants, diluent and from about 25% to about 85% of the catalyst composition to a suitable reactor and maintaining the resulting mixture at polymerization conditions with the remainder of the catalyst composition to be added only after the polymer concentration in the polymer-containing suspension has reached a value of at least 0.2 g of polymer per 100 g of suspension. The provision to the reaction mixture of the entire quantity of catalyst composition at the outset of polymerization or the provision of the remaining catalyst composition at a time when the catalyst composition is lower than 0.2 g of polymer per 100 g of suspension does not result in production of polymer of the desired bulk density of at least about 0.2 g/ml.

The desired improvement in product bulk density is obtained when a relatively minor amount of the catalyst composition, e.g., 25% to 30%, is provided to the polymerization mixture at the outset of polymerization or when a relatively major proportion of catalyst composition, e.g., 80% or 85% of the total catalyst composition, is provided at the outset of polymerization. The remaining portion of the catalyst composition is provided to the polymerization mixture only when the polymer concentration has reached at least 0.2 g per 100 g of polymer-containing suspension. The remaining portion of the catalyst composition is added in one or more increments. When the remaining catalyst composition is added in more than one step, it is preferred to control the addition so that the amount of catalyst composition added is no more than one-half the amount of catalyst composition previously provided. A typical multi-step subsequent addition would provide 40% of the catalyst composition to the polymerization mixture at the outset of polymerization with the remaining portion of the catalyst composition being added in three steps in amounts of 10%, 20% and 30% of the total catalyst composition. In a particularly preferred embodiment of the process wherein less than 50% of the catalyst composition was initially provided, the remaining catalyst composition is provided in at least two portions only when the polymer concentration has reached a value of 1.0 g per 100 g of the polymer-containing suspension.

Subsequent to the completion of the polymerization, the polymer product is recovered by conventional methods such as filtration or decantation. The polymer product is used as such or is purified if desired as by washing with a solvent selective for the catalyst residues in the polymer.

The polyketone polymer products are premium thermoplastics having utility in the production of shaped articles by conventional methods such as extrusion, injection molding or thermoforming. The polymers are particularly useful in the production of wires and cables, sheets, laminates and containers for the food and drink industry. The polymers of the present invention of relatively high bulk density are especially useful because of the advantages gained in production, storage and transportation of the polymers resulting from a greater quantity of polymer per unit volume.

The invention is further illustrated by the following Comparative Examples (not of the invention) and the following Illustrative Embodiments which should not be construed as limiting the invention. In each case the terpolymer product was analyzed by $^{13}$C-NMR analysis and found to be of a linear structure with —CO—CH$_2$—CH$_2$— units and —CO—C$_3$H$_6$— units occurring randomly within the terpolymer.

COMPARATIVE EXAMPLE I

A terpolymer of carbon monoxide, ethylene and propylene was produced by charging to a 150 liter mechanically stirred autoclave 56 kg of methanol. The contents of the autoclave were heated to 45° C. and carbon monoxide, ethylene and propylene were added to give partial pressures of 23 bar of carbon monoxide, 23 bar of ethylene and 8.5 bar of propylene. A catalyst solution was then added which was formed from 45 ml of methanol, 150 ml of toluene, 2 mmol of palladium acetate, 40 mmol of trifluoroacetic acid and 2 mmol of 1,3-bis(diphenylphosphino)propane. During the polymerization process, the pressure was maintained at 45 bar by the addition of an equimolar mixture of carbon monoxide and ethylene. Polymerization was terminated after 96 hours by cooling the reaction mixture to room temperature and releasing the pressure. The terpolymer product was recovered by filtration, washed with methanol and dried at 50° C.

The yield of terpolymer was 7.7 kg of terpolymer of a bulk density of 0.08 g/ml.

COMPARATIVE EXAMPLE II

A carbon monoxide/ethylene/propylene terpolymer was produced by the procedure of Comparative Example I, except that the polymerization time was 80 hours instead of 96 hours and 95% of the catalyst solution was present at the outset of polymerization with the remainder being added to the autoclave when the polymer concentration had reached 6.0 g per 100 g of polymer-containing suspension.

The yield of product was 6.8 kg of terpolymer having a bulk density of 0.11 g/ml.

COMPARATIVE EXAMPLE III

A carbon monoxide/ethylene/propylene terpolymer was produced by the procedure of Comparative Example I, except that the reaction time was 90 hours instead of 96 hours and that 15% of the catalyst solution was present at the outset of polymerization with the remaining 85% being added to the autoclave when the polymer concentration had reached 1.0 g per 100 g of polymer-containing suspension.

The yield of product was 7.2 kg of terpolymer having a bulk density of 0.09 g/ml.

COMPARATIVE EXAMPLE IV

A carbon monoxide/ethylene/propylene terpolymer was produced by the procedure of Comparative Example I except that the reaction time was 85 hours instead of 96 hours and that 50% of the catalyst solution was present at the outset of polymerization with the remainder of the catalyst solution being added when the polymer concentration had reached 0.1 g per 100 g of polymer-containing suspension.

The yield was 7.0 kg of polymer having a bulk density of 0.0855 g/ml.

ILLUSTRATIVE EMBODIMENT I

A terpolymer of carbon monoxide, ethylene and propylene was produced by a procedure substantially similar to that of Comparative Example I except tha the reaction time was 105 hours instead of 96 hours and that 72% of the catalyst solution was present in the autoclave at the outset of polymerization with the remaining 28% being added to the autoclave when the polymer concentration had reached 2.1 g of polymer per 100 g of polymer-containing suspension.

The yield of product was 7.5 kg of terpolymer having a bulk density of 0.4 g/ml.

ILLUSTRATIVE EMBODIMENT II

A terpolymer of carbon monoxide, ethylene and propylene was produced by a procedure substantially similar to that of Comparative Example I except that the reaction temperature was 55° C. instead of 45° C., the reaction time was 80 hours intead of 96 hours and 83% of the catalyst solution was present in the autoclave at the outset of polymerization with the remaining 17% being added when the polymer concentration had reached 0.3 g of polymer per 100 g of polymer-containing suspension.

The yield was 7.5 kg of terpolymer having a bulk density of 0.37 g/ml.

ILLUSTRATIVE EMBODIMENT III

A carbon monoxide/ethylene/propylene terpolymer was produced by a process similar to that of Comparative Example I except that the reaction time was 125 hours instead of 96 hours and one-third of the catalyst solution was present at the outset of polymerization with an additional one-third being added when the polymer concentration had reached 2.0 g per 100 g of polymer-containing suspension and the remaining one-third being added when the polymer concentration had reached 4.0 g of polymer per 100 g of polymer-containing suspension.

The yield of product was 7.0 kg of terpolymer having a bulk density of 0.32 g/ml.

What is claimed is:

1. In the process of producing a linear alternating polymer of carbon monoxide and at least one ethylenically unsaturated hydrocarbon by contacting under polymerization conditions a reaction mixture of the carbon monoxide and hydrocarbon in the prsence of a catalyst composition formed from a palladium compound, the anion of a non-hydrohalogenic acid having a pKa below about 6 and a bidentate ligand of phosphorus and a polymerization diluent, the improvement which comprises providing to the reaction mixture from about 25% to about 85% of the catalyst composition at the outset of polymerization and subsequently providing the remainder of the catalyst composition when the concentration of polymer product has reached a value of at least 0.2 g per 100 g of the suspension of the polymer in the diluent.

2. The process of claim 1 wherein no more than 50% of the catalyst composition is provided at the outset of polymerization and the remainder of the catalyst composition is subsequently provided in at least two additional portions.

3. The process of claim 2 wherein the remainder of the catalyst composition is provided when the polymer concentration reaches a value of at least 1.0 g per 100 g of polymer-containing suspension.

4. The process of claim 2 wherein the amount of each subsequent catalyst composition addition is in an amount no more than half the amount of catalyst composition previously provided.

* * * * *